United States Patent [19]
Zaghi et al.

[11] 4,325,048
[45] Apr. 13, 1982

[54] DEFORMABLE FLEXURE ELEMENT FOR STRAIN GAGE TRANSDUCER AND METHOD OF MANUFACTURE

[75] Inventors: Hooshmand Zaghi, Oxnard; Thomas C. Tisone, Thousand Oaks, both of Calif.

[73] Assignee: Gould Inc., Rolling Meadows, Ill.

[21] Appl. No.: 125,833

[22] Filed: Feb. 29, 1980

[51] Int. Cl.$^3$ .............................................. G01L 1/22
[52] U.S. Cl. .................................... 338/3; 73/862.65
[58] Field of Search ...................................... 338/2–5; 73/141 A, 862.65

[56] References Cited

U.S. PATENT DOCUMENTS 3,341,796 9/1967 Eisele ........................... 73/141 A X
3,577,779 5/1971 Laimins ............................... 338/5 X
4,128,001 12/1978 Marks ................................ 73/141 A
4,212,197 7/1980 Kawai et al. ...................... 73/141 A

FOREIGN PATENT DOCUMENTS

2552170 5/1977 Fed. Rep. of Germany ... 73/862.65

Primary Examiner—C. L. Albritton

[57] ABSTRACT

An improved deformable flexure element (10) for use in strain gage tranducers and a process for making the element are disclosed. By appropriate selection of materials and gage geometries in accordance with the invention, the zero and span temperature coefficients of the transducer are reduced substantially to zero. Improved processes for producing such flexure elements are disclosed.

18 Claims, 7 Drawing Figures

$\Delta TCR = TCR_T - TCR_C$

DEFORMABLE FLEXURE ELEMENT FOR STRAIN GAGE TRANSDUCER AND METHOD OF MANUFACTURE

TECHNICAL FIELD

The present invention relates to strain gage transducers and methods for their manufacture. Such transducers typically include a flexure element having deposited thereon one or more small resistance elements or strain gages whose electrical properties change with deformation of the element. The gages may be deposited by sputtering, vacuum evaporating or other thin film producing techniques. The invention concerns techniques for reducing the temperature sensitivity of transducers embodying such strain gages.

BACKGROUND ART

Strain gage devices have been used for many years to measure strain induced in a structure by application of some deforming force. Older gases comprised one or more thin wires or metal foils which were glued to the structure to be tested, usually with an electrically insulating substrate such as paper between the gage wire or foil and the underlying structure. Strains in the structure would be transmitted to the gage wire, thus modifying its electrical properties in a manner proportional to the applied force. More modern gages comprise thin film resistance elements deposited directly on the deformable structure using sputtering, vacuum evaporating or other thin film producing techniques.

Whatever the type of gage used, those skilled in the art have long recognized that the performance of many gages is highly temperature dependent. For example, the zero setting of the gage may shift due to changes in ambient temperature and temperature gradients in the underlying support structure thus producing an apparent strain when no load has been applied. Also, the span of the gage may change with temperature so that a given change in output of the Wheatstone bridge commonly used in such applications may indicate different applied forces depending on the temperature at which the gage is operating. Numerous attempts have been made to compensate strain gage transducers for the effects of temperature, in the hope of producing a substantially temperature independent transducer.

Ruge discloses in U.S. Pat. Nos. 2,350,972 and 2,390,038 types of strain gages in which one gage wire is chosen to have a negative thermal coefficient of resistance (TCR); and the other, to have a positive TCR. Ruge's U.S. Pat. No. 2,672,048 discloses a temperature compensated strain gage device in which the resistances of the gage elements in a bridge are adjusted in proportion to their thermal coefficients, thus reducing thermal effects. Gay's U.S. Pat. No. 3,184,962 discusses changes in the characteristics of the underlying support structure with temperature; but Gay appears to ignore any thermally induced variation in the gage factor.

U.S. Pat. No. 3,196,668 issued to McLellan discloses a semiconductor strain gage in which the resistivities of gage elements of opposite conductivity types are carefully matched to provide temperature compensation of zero balance and the temperature coefficients of the gage elements are chosen to be identical and positive to give identical resistance changes with temperature. Russell disclosed in U.S. Pat. Nos. 3,245,016 and 3,448,607 types of temperature compensated wire strain gages in which temperature coefficients of resistance and expansion were considered to reduce temperature sensitivity in wire gages. In U.S. Pat. No. 3,290,928, Curry recognized the existence of changes in gage output due to temperature differential among the gages and due to thermally induced strain in the underlying structure and used geometric placement of the gages and external circuitry to provide compensation. Stedman's U.S. Pat. No. 3,303,693 shows an arm type film bridge in which compensation is provided by a compensating resistance in series with certain gage resistances, the compensating resistance having an opposite thermal coefficient of resistance.

Watanabe et al disclose in U.S. Pat. No. 3,609,625 a type of semiconductor strain gage in which the TCR of the gage material is essentially constant over a range of temperatures. More recently, Ort shows in U.S. Pat. No. 4,116,075 a technique for minimizing thermal imbalances between resistances deposited on a flexure element, by providing asymmetric gage geometries.

DISCLOSURE OF THE INVENTION

While such prior art devices have achieved some success in reducing thermal errors in strain gage transducers, such errors continue to be critical performance parameters for strain gage devices of all types. A principle object of the present invention is to provide a thin-film strain gage transducer in which shifts in zero setting and span due to thermal effects are reduced to very small, substantially negligible magnitudes.

Another object of the invention is to provide such a transducer in which transducer accuracy is optimized in a desired range of strain, by reducing the sum of the zero and span temperature coefficients substantially to zero.

A further object of the invention is to provide an improved method of manufacturing such transducers, in which thermal performance of the transducer is improved by appropriate selection of the orientation of the flexure elements during deposition of the gage resistance material.

These objects are given only by way of example; thus, other desirable objectives and advantages inherently achieved by the disclosed invention may occur to those skilled in the art. The scope of the invention is to be limited only by the appended claims.

In one preferred embodiment of the invention, an improved deformable flexure element for use in strain gages is provided which includes a deformable body having at least one flat surface, a first portion of the body beneath this surface being subjected to tension during deformation of the body and a second portion of the body beneath this surface being subjected to the compression during such deformation. A pair of resistances is deposited on this surface by sputtering, vapor deposition or other techniques, with one resistance of the pair above each of the first and second portions. The body and the resistances are formed from materials such that $$[TCR_f] \frac{d(\Delta T)}{dT} + \Delta TCR \cdot \frac{dT_2}{dT},$$

the zero temperature coefficient (ZTC) of the flexure element, substantially equals zero. In this formulation, $TCR_f$ is the thermal resistance coefficient of the resistances; $\Delta T$ is the temperature gradient between the resistances on the first and second portions; $T$ is the ambient temperature; ΔTCR is the gradient of the thermal resistance coefficient between the resistances on the first and second portions; and $T_2$ is the temperature of the second portion. The expression for ZTC may be made substantially equal to zero by forming the flexure elements so that the two terms of the expression are essentially equal in magnitude but of opposite sign. Alternatively, the expression may be made substantially equal to zero by making each of its terms negligible.

In a particularly preferred embodiment of the invention, the deformable body is made from 17-4 PH stainless steel and the resistances are made up from tantalum-tantalum pentoxide cermet films which have been deposited at a rate of 30 to 150 Angstroms per minute under a bias from zero to minus 250 volts at a temperature from 150° to 350° centigrade, following which the deformable body is annealed from 2 to 24 hours at a temperature of from 300° to 600° centigrade in an argon or nitrogen atmosphere.

In another embodiment of the invention, a deformable body of the type previously described is provided in which the body and the resistances are made of materials such that the expression $$TCG - TCE$$

substantially equals zero. In this expression, TCG is the thermal coefficient of the gage factor of the flexure element and TCE is the thermal coefficient at constant strain for the Young's modulus of the material of the body. By reducing the difference between the terms to substantially zero, the span temperature coefficient of a transducer comprising the body is reduced essentially to zero. Preferably, the body is 17-4 PH stainless steel and the resistances are Ta—Ta$_2$O$_5$ cermet films deposited under conditions as previously described.

In addition to embodiments in which the zero and span temperature coefficients are separately made substantially equal to zero, the invention also includes flexure elements in which the sum of these coefficients is made very small. That is, the expression $$\frac{1 \times 10^4 \, G\epsilon \, (TCG - TCE)}{G\epsilon_0} + \frac{1 \times 10^4}{2G\epsilon_0} \left[ [TCR_f] \frac{d(\Delta T)}{dT} + \Delta TCR \frac{dT_2}{dT} \right]$$

is made substantially equal to zero. In this expression, G is the gage factor of the flexure element; ε is strain at a given deflection of the bodies; $\epsilon_o$ is strain at fullscale deflection of the bodies; TCG is the thermal coefficient of the gage factor; TCE is the thermal coefficient at constant strain for the Young's modulus of the material of the body; $TCR_f$ is the thermal resistance coefficient of the resistances; ΔT is the temperature gradient between the resistances on said first and second portions; T is the ambient temperature; ΔTCR is the gradient of the thermal resistance coefficient between the resistances on said first and second portions; and $T_2$ is the temperature of said second portion.

Applicants have also discovered that the orientation of the deformable bodies during deposition of the resistances can significantly affect the magnitudes of the zero temperature coefficient. Thus, in one method according to the invention, the deformable bodies are oriented during deposition so that the first and second portions of the body as previously described are respectively equidistant from the center of the deposition apparatus. By this means, the ΔTCR between the resistances deposited on the deformable bodies is rendered negligible. Also, by orienting the deformable bodies so that the first portion of said body is spaced further from the center of the apparatus than the second portion of said body, ΔTCR can be maintained at a value less than zero for resistances formed above the first and second portions, thereby offsetting the contribution of $$[TCR_f] \frac{d(\Delta T)}{dT}$$

to ZTC.

Finally, without regard to the orientation of the deformable flexure bodies during deposition of the resistances, the invention comprises a method in which a layer of Ta—Ta$_2$O$_5$ cermet is deposited onto the flat surface of the flexure body at a rate of 30 to 150 Angstroms per minute under a bias of from zero to minus 250 volts and at a temperature of from 150° to 350° centigrade. Thereafter, portions of the layer are selectively removed to define the strain gage resistances and the body is annealed for from 2 to 24 hours at a temperature of from 300° to 600° in an argon or nitrogen atmosphere.

BEST MODE FOR CARRYING OUT THE INVENTION

The invention will be described with reference to the drawings, in which like reference numerals identify like elements of structure in the several Figures.

Figure 1:
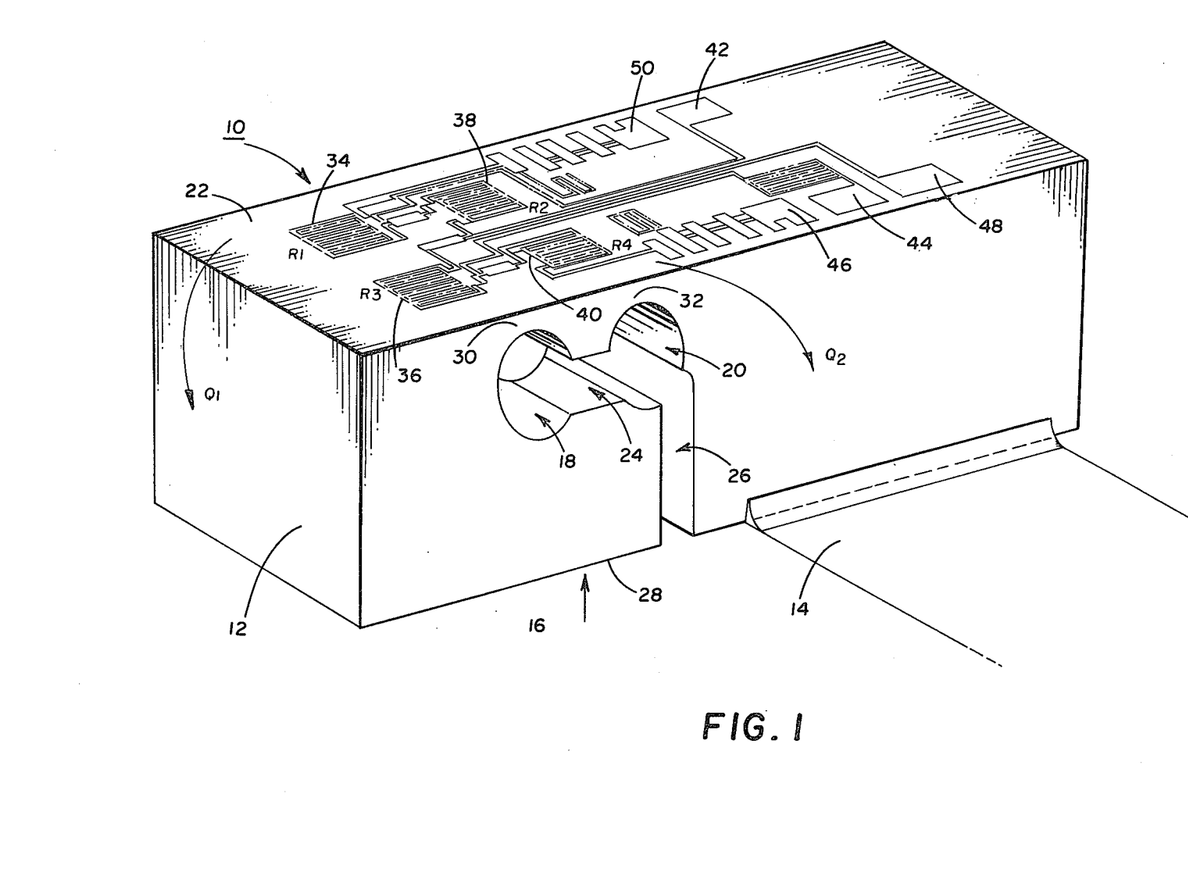
FIG. 1 shows a perspective view of a deformable deflection element of the type suitable for use in the present invention.

Referring to FIG. 1, a deformable flexure element 10 is shown, of the type suitable for use in the present invention. A beam or block 12 of resilient material such as 17-4 PH stainless steel is rigidly attached at one end to a support structure 14. The force to be measured is applied to the outer, free end of block 12 as indicated by the arrow 16. A pair of holes 18, 20 are provided through the thickness of block 12 just below its upper, flat surface 22. A horizontal slot 24 joins holes 18, 20 and a vertical slot 26 extends from the inner edge of hole 20 downward through the lower surface 28 of block 12. Thin flexible webs 30, 32 are thus defined between holes 18, 20 and surface 22, so that when a force is applied as indicated, block 12 deforms so that the portion of block 12 comprising web 30 is placed in tension; and the portion of block 12 comprising web 32 is placed in compression.

A four element, fully active Wheatstone bridge preferably is deposited on surface 22, having two thin film resistances 34, 36 above web 30 and two thin film resistances 38, 40 above web 32. A half bridge with one tension resistance and one compression resistance also could be used. The resistances 34, 38 comprise a pair of strain gages forming one side of the bridge; and resistances 36, 40, the other. In the following discussion, it is assumed that the four resistances are of equal value since differences in resistance among the bridge elements can introduce another type of error in transducer performance. Power to the bridge is supplied via pads 42, 44 and the bridge output is taken from pads 46, 48, 50 in the conventional manner. Other compensating resistors, illustrated in FIG. 1 for completeness, may also be included but comprise no part of the present invention.

When the bridge is in operation, resistances 34, 36 generate heat which flows into the outer end of block 12, as indicated by arrow $Q_1$, and also into the surrounding atmosphere. At the other end of block 12, heat generated by resistances 38, 40 flows into the inner end of block 12 and support structure 14, as indicated by arrow $Q_2$, and into the surrounding atmosphere. Due to the nature of the illustrated design of block 12, the heat flow is asymmetric with $Q_1$ generally less than $Q_2$ due to the larger thermal mass of the inner end and support structure 14, so that a temperature gradient is developed in block 12 between the regions of tension and compression. Thus, the temperature $T_1$ in the region of compression typically will be less than the temperature $T_2$ in the region of tension. This gradient causes an output variation of the bridge which may mistakenly be taken as an indication of applied force when only temperature effects are to blame. The temperature gradient may occur during warm-up of the bridge at constant ambient temperature or as a result of changes in the ambient temperature.

To define the unique solution of the present invention to the problem of temperature compensation, applicants have analyzed the various factors contributing to thermal errors in the output of a device of the type shown in FIG. 1. Those skilled in the art will understand that the following analysis is applicable as well to deformable flexure elements of other geometries, such as diaphragms, which also have areas of tension and compression subject to thermal gradients.

The resistance of a free-standing resistor is defined by its length L and its temperature T, so that $$R = R(L,T)$$

Thus, a change in resistance due to length and for temperature changes is defined by:

$$dR = \frac{\partial R}{\partial L}\bigg|_T dL + \frac{\partial R}{\partial T}\bigg|_L dT \quad (1)$$

Since $$R = \frac{\rho L}{A} = \frac{\rho L}{wh} \quad (2)$$

where $\rho$ is resistivity; A is area; w is width; h is height and L is length of the thin film resistance, it can be shown that:

$$\frac{dR}{R} = \left[\frac{L}{\rho}\frac{\partial \rho}{\partial L} + 1 - \frac{L}{w}\frac{\partial w}{\partial L} - \frac{L}{h}\frac{\partial h}{\partial L}\right]\frac{dL}{L} + \quad (3)$$

$$\left[\frac{1}{\rho}\frac{\partial \rho}{\partial T} + \frac{1}{L}\frac{\partial L}{\partial T} - \frac{1}{w}\frac{\partial w}{\partial T} - \frac{1}{h}\frac{\partial h}{\partial T}\right]dT.$$

Noting that $$-\frac{\partial w/w}{\partial L/L} = -\frac{\partial h/h}{\partial L/L} = \nu = \text{Poisson's ratio;}$$

$$\frac{dL}{L} = \epsilon = \text{Strain;}$$

$$\frac{1}{L}\frac{dL}{dT} = \alpha_{fl} = \text{Thermal Expansion Coefficient of Resistor in length;}$$

$$\frac{1}{w}\frac{\partial w}{\partial T} = \alpha_{fw} = \text{Thermal Expansion Coefficient of Resistor in width;}$$

$$\frac{1}{h}\frac{\partial h}{\partial T} = \alpha_{fh} = \text{Thermal Expansion Coefficient of Resistor in height;}$$

$$\frac{1}{\rho}\frac{\partial \rho}{\partial L/L} + 1 + 2\nu = \frac{1}{R}\frac{dR}{\epsilon}\bigg|_{T=\text{constant}} = G = \text{Gage Factor;}$$

and $\frac{1}{\rho}\frac{\partial \rho}{\partial T} = $ Temperature Coefficient of Resistivity Equation (3) can be written:

$$\frac{dR}{R} = G\epsilon + \left[\frac{1}{\rho}\frac{\partial \rho}{\partial T} + \alpha_{fl} - \alpha_{fw} - \alpha_{fh}\right]dT. \quad (4)$$

When a thin film resistor is bonded to a deformable flexure element such as body 12, the strain experienced by the resistor or strain gage will be a combination of applied strain due to external forces deforming the body and thermally induced strain due to differential thermal expansion between the resistor and the flexure element. The actual geometric change of a thin film resistor due to thermal expansion in length and width is constrained by the flexure to that of the flexure. However, ignoring edge effects, the dimensional change of the resistor in height is not constrained by the flexure. In such a case, Equation (4) can be written:

$$\frac{dR}{R} = G\epsilon + \left[\frac{1}{\rho}\frac{\partial \rho}{\partial T} + \alpha_s - \alpha_s - \alpha_{fh}\right]dT_x. \quad (5)$$

Where $$TCR =$$

$$\left[\frac{1}{\rho}\frac{\partial \rho}{\partial T} - \alpha_{film}\right] = \text{Temperature Coefficient of Resistance;}$$

$\alpha_s = $ Thermal Expansion Coefficient of Flexure Element; and $\alpha_{film} \cong \alpha_{fh} \times$ Resistor's Nominal Linear Coefficient of Expansion, then $$dR/R = G\epsilon + [TCR]\, dT. \quad (6)$$

Thus far, dT is considered to be an isothermal temperature change for the overall system so that there is no temperature gradient among the resistors on the flexure element.

For a fully active Wheatstone bridge of the type shown in FIG. 1, the simplified bridge equation is given by:

$$\frac{E_o}{V} = \tfrac{1}{4}\left[\frac{\Delta R_1}{R_1} - \frac{\Delta R_2}{R_2} + \frac{\Delta R_3}{R_3} - \frac{\Delta R_4}{R_4}\right], \quad (7)$$

where $1 = 3 =$ tension and $2 = 4 =$ compression; $V =$ input voltage and $E_o =$ output voltage. Since a temperature gradient can exist between the tension and compression arms of the bridge as previously discussed, Equation (6) may be written for a single arm in the form:

$$dR_i/R_i = G_i\epsilon_i + [TCR_i](T_i - T_o), \quad (8)$$

where $i = 1 - 4$. The following conditions can be assumed to be valid:

$T_o = 0\,°K$
$G_i = G$
$\epsilon_1 = \epsilon_3 = -\epsilon_2 = -\epsilon_4$
$T_1 = T_3,\ T_2 = T_4;\ T_1 = T_2 + \Delta T$
$TCR_1 = TCR_3,\ TCR_2 = TCR_4$
$TCR_1 = TCR_2 + \Delta TCR$ Combining Equations (7) and (8) and eliminating the negligible second order term $\Delta TCR \cdot \Delta T$, the following result is obtained:

$$E_o/V = G\epsilon + \tfrac{1}{2}[TCR_2 \cdot \Delta T + \Delta TCR \cdot T_2] \quad (9)$$

Thus, the thermal error coefficients of the flexure element shown in FIG. 1 are defined by taking the derivative of Equation (9) with respect to temperature and simplifying, as follows:

$$\frac{1}{G\epsilon_o}\frac{d\frac{E_o}{V}}{dT} = \frac{G\epsilon}{G\epsilon_o}(TCG - TCE) + \frac{1}{2G\epsilon_o}\left[[TCR_f]\frac{d\Delta T}{dT} + \Delta TCR\frac{dT_2}{dT}\right] \quad (10)$$

where $G\epsilon_o$ is the full scale output, T is the ambient temperature;

$$TCG = \frac{1}{G}\left.\frac{\partial G}{\partial T}\right|_\epsilon = \text{Thermal Coefficient of Gage Factor;}$$

$$TCE = \frac{1}{E}\left.\frac{\partial E}{\partial T}\right|_\epsilon = \text{Thermal Coefficient of Young's Modulus } (E) \text{ for the material of body 12; and}$$

the terms $dTCR_2/dT$ and $d\Delta TCR/dT$ are assumed to be essentially negligible. $TCR_f$ is equal to $TCR_2$, the nominal temperature coefficient of the resistance elements in the compression position.

Thus, transducer thermal performance may be defined in terms of two thermal coefficients, STC, the span coefficient (% error/100° F.) and ZTC, the zero coefficient (% error/100° F.). From Equation (10), $$STC = \frac{1 \times 10^4 \times G\epsilon}{G\epsilon_o}(TCG - TCE) \quad (11a)$$

$$ZTC = \frac{1 \times 10^4}{2G\epsilon_o}\left[[TCR_f]\frac{d(\Delta T)}{dT} + \Delta TCR \cdot \frac{dT_2}{dT}\right] \quad (11b)$$

Figure 2:
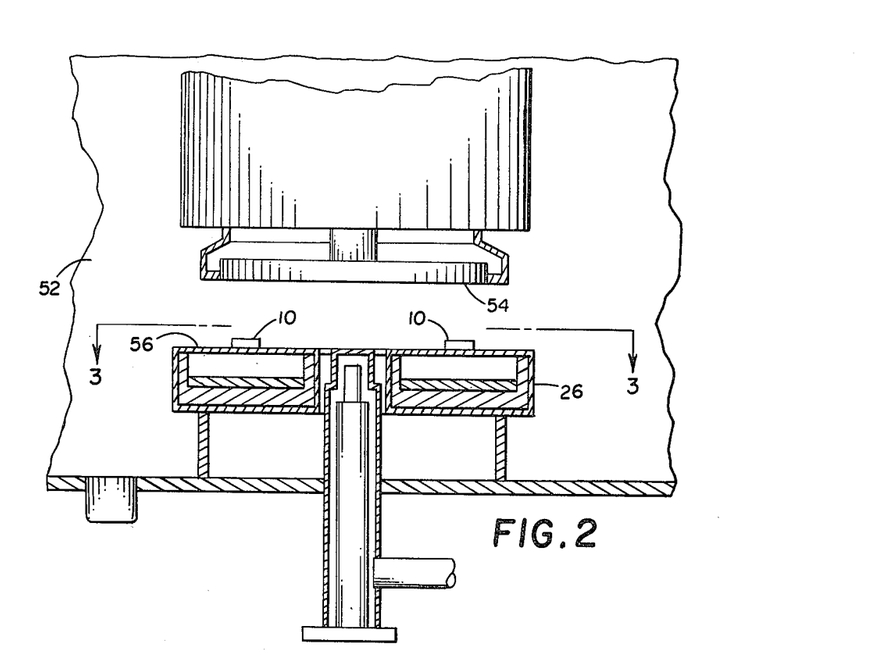
FIG. 2 shows a schematic elevation view, partially in section, of a sputter deposition apparatus suitable for practicing the method according to the present invention.
Figure 3:
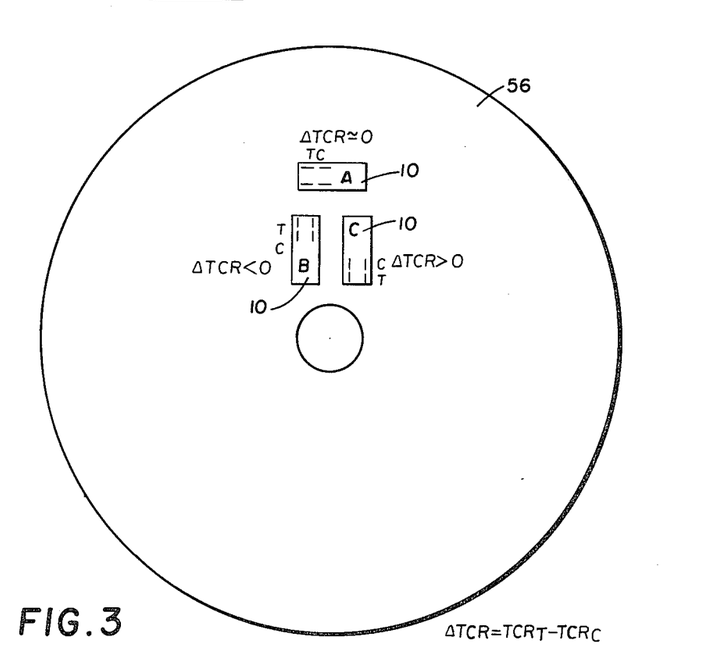
FIG. 3 shows a plan view of the deposition pallet used in the apparatus of FIG. 2, taken along Line 3—3 of FIG. 2.

Before considering the centrality of Equations (11a) and (11b) to the present invention, reference is made to FIGS. 2 and 3 which illustrate schematically one type of apparatus suitable for making flexure elements of the type shown in FIG. 1. Although a sputtering apparatus is shown for purposes of description in FIGS. 2 and 3, those skilled in the art will appreciate that other apparatuses for depositing thin film resistances may also be used without departing from the scope of the present invention, such as vacuum evaporation apparatuses. The sputtering chamber 52 is essentially a hollow enclosure which is constructed to maintain a very low pressure interior by means of a vacuum pump connected therewith. A target 54 maintained at a large negative potential is located within the chamber just above a deposition pallet 56 which supports a plurality of flexure elements 10 on which thin film resistance elements are to be deposited. The physical principles of sputtering film deposition are well known to those skilled in the art; so it suffices in the present context to understand that when a large electric potential is established between a target such as tantalum and a substrate such as elements 10, the ambient gas between the target and the substrate is ionized and accelerated toward the target. Through momentum transfer, atoms from the target are ejected toward the substrate and deposited thereon as a thin film. After a relative layer is deposited, conventional techniques are used to remove portions of the layer to define the gage resistors shown in FIG. 1. The complete details of a reactive sputtering system of this type are shown in U.S. Ser. No. 908,808, filed May 24, 1978 for Deposition Process Monitoring and Control System, the invention of Thomas C. Tisone and Thomas S. Latos.

FIG. 3 shows a plan view of pallet 56 with three flexure elements 10 arranged in various positions, one (element A) essentially perpendicular to a radius extending from the center of pallet 56 and target 54; and two (elements B and C) essentially parallel to the same or other radii. Elements B and C are also oriented with different ends of block 12 facing toward the center. The significance of these orientations will be discussed shortly.

Figure 4:
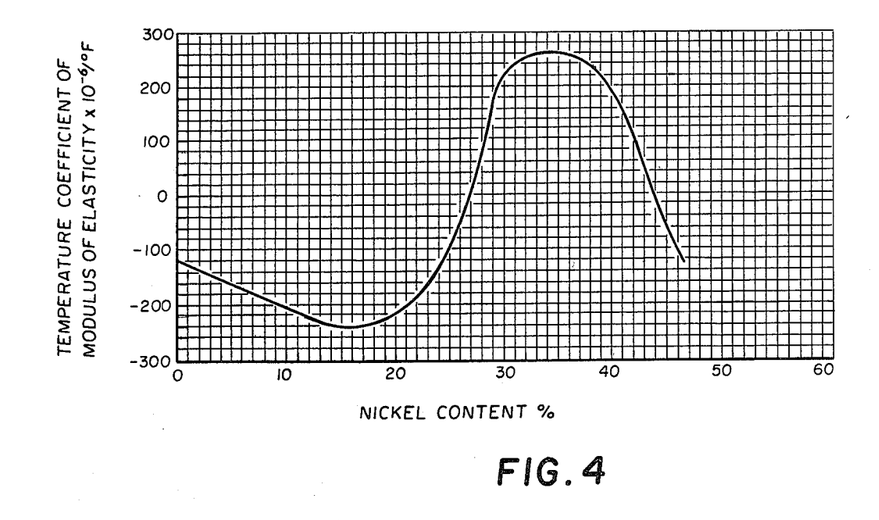
FIG. 4 shows a plot of the temperature coefficient of the modulus of elasticity of iron-nickel alloys versus nickel content.

Referring again to Equation (11a), STC is seen to be a function of strain $\epsilon$, gage factor G and the two coefficients TCG and TCE. To minimize the effect of temperature on the span of the transducer, applicants have found that the quantity (TCG-TCE) should be made as small as possible, preferably substantially zero. From a practical point of view, a finished transducer is considered to have "substantially zero" error when STC and ZTC are in the range $\pm 0.5\%/100°$ F., without external compensation. Using the present invention, this range can be narrowed to $\pm 0.25\%/100°$ F. Typically in prior art devices, STC is not zero for a given transducer and is compensated by external circuitry so that STC is held within the range $|STC| \leq 0.5\%/100°$ F. For most materials, $TCE < 0$, though some special alloys exhibit TCE>0 for limited temperature ranges. For example, FIG. 4 shows TCE versus composition for nickel-iron alloys. Other alloys exhibiting TCE>0 are known, examples of which are shown in *Alloy Digest,* published September, 1953 by Engineering Alloys Digest, Inc., Upper Montclair, N.J. Alloys thus are available for which TCE varies in the range $-270 \leq TCE \leq +260 \times 10^{-6}/°F$. The important fact to note is that forcing TCE to zero is not sufficient to make STC equal zero, a point which has not been completely understood in the prior art.

Typical values of TCG range between $-400$ and $+400 \times 10^{-6}/°F$. for commonly used thin film resistance materials, such as tantalum oxide cermet, chromium-silicon-oxygen and tantalum-oxygen-nitrogen. TCG is dependent upon several variables, as will be understood by those skilled in the art, such as the composition of the thin film resistance and its metallurgical structure. TCG can be varied using vacuum evaporation processes and sputtering deposition processes of the type disclosed in Ser. No. 908,808 by choice of target materials such as Ta, $TaN_2$ and the like; by choice of background pressure of the reactive gases; by variation of deposition rate, temperature and bias voltage during sputtering; and variation of annealing times, temperatures and atmospheres following deposition. The following specific examples show how TCE, G and TCR can be varied during sputtering deposition, as desired to reduce ZTC and STC to very low magnitudes.

Example I—Ta—$Ta_2O_5$ film and 17-4 stainless flexure

| Deposition Conditions | |
|---|---|
| Rate: 80–150 Angstroms/min. | TCR = $-12 \times 10^{-6}/°F$. |
| Temperature: 300° C. | TCG = $-130 \times 10^{-6}/°F$. |
| Anneal: 400° C., 2 hrs., argon | G = 5.5 |
| Bias: $-50$ v. | STC = $+1.2\%/100°$ F. |
| | ZTC = $+0.25\%/100°$ F. |

Example II—same film and flexure

| | |
|---|---|
| Rate: 80–150 Angstroms/min. | TCR = $-55 \times 10^{-6}/°F$. |
| Temperature: 300° C. | TCG = $-80 \times 10^{-6}/°F$. |
| Anneal: 400° C., 2 hrs., argon | G = 4.0 |
| Bias: none | STC = $+1.9\%/100°$ F. |
| | ZTC = $+0.6\%/100°$ F. |

Example III—Tantalum nitride film and same flexure

| | |
|---|---|
| Rate: 30–100 Angstroms/min. | TCR = $-81.7$ ppm/°C. |
| Temperature: 300° C. | TCG = $-246$ ppm/°F. |
| Anneal: 400° C., 2 hrs., nitrogen | G = 4.0 |
| Bias: $-50$ v. | STC = $0.24\%/100°$ F. |
| | ZTC = $-0.12\%/100°$ F. |

Actual experience with the processes according to the invention has shown that ZTC and STC can be reduced to very small values for sputter deposition rates of from 30 to 150 Angstroms per minute at temperatures of from 150° to 350° C. with bias of 0 to $-250$ volts. Subsequent annealing temperatures preferably are in the range of 300° to 600° C. for up to 24 hours with an argon or nitrogen atmosphere.

Figure 5:
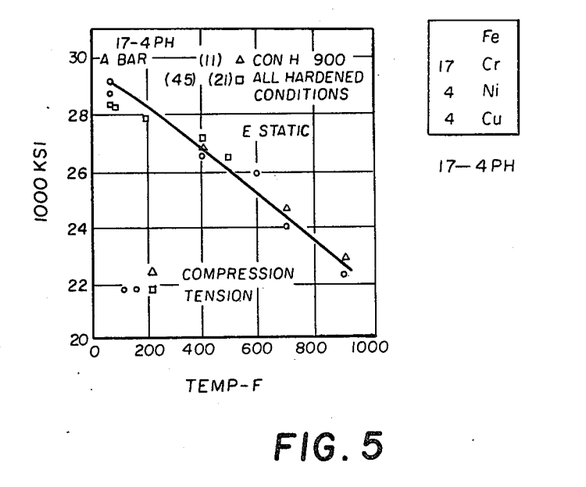
FIG. 5 shows a plot of modulus of elasticity versus temperature, particularly for 17-4 PH stainless steel.

For most materials suitable for use in body 12, other than the special alloys previously mentioned, TCE ranges between $-100$ to $-400 \times 10^6/°F$. For example, 17-4 PH stainless steel has a TCE of approximately $-270 \times 10^{-6}/°F$., as calculated from data shown in FIG. 5, taken from *Ferrous Alloys* published by Belfour Stulen in 1978, code 1501, page 21. Other examples are known from the literature, such as 17-7 PH stainless steel for which TCE = $-330 \times 10^{-6}/°F$. Other examples are listed in *Ferrous Alloys* published by Belfour Stulen in 1970, code 1520, page 23.

Thus, by proper selection of resistor and substrate or flexure materials in accordance with the invention, STC may be made substantially equal to zero. By "substantially equal to zero" is meant that |STC| is approximately $0.25\%/100°$ F. in actual use of a transducer embodying the invention.

Figure 6:
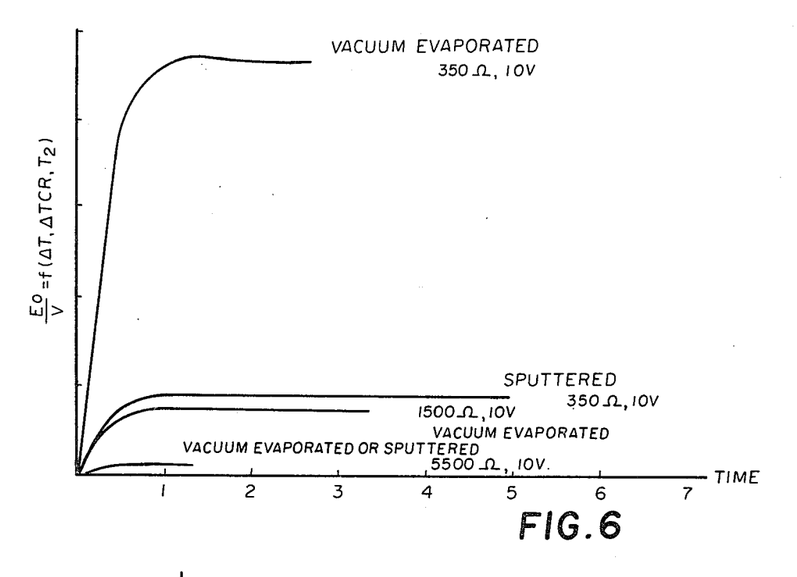
FIG. 6 shows a plot of output versus time, for various bridge resistances at constant ambient temperature and different power densities.
Figure 7:
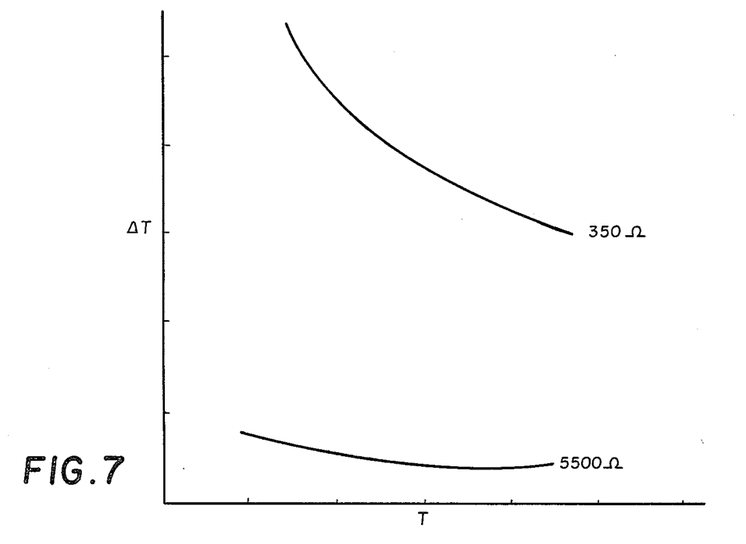
FIG. 7 shows a plot of temperature differential between tension and compression gages versus ambient temperature, for different bridge resistances.

Minimization of ZTC requires that the sum $$[TCR_f] \frac{d(\Delta T)}{dT} + \Delta TCR \cdot \frac{dT_2}{dT}$$

be made to be substantially equal to zero. The factor $d(\Delta T)/dT$ will be considered first. $\Delta T$ is the temperature gradient between the tension and compression arms of the bridge, where $\Delta T$ is positive for tension arm temperature greater than compression arm temperature. $\Delta T$ is dependent on ambient temperature, asymmetry of heat conduction, time after power turn on, bridge resistance (power dissipation) and power density, as illustrated in FIGS. 6 and 7. It can be demonstrated that $\Delta T$ is positive and independent of ambient temperature for heat transfer by conduction, and that $\Delta T$ remains positive but is reduced in magnitude by heat transfer by radiation. Thus, for the configuration shown in FIG. 1, $\Delta T$ is always positive and will decrease with increasing ambient temperature so that $d(\Delta T)/dT \leq 0$. Thus, $d(\Delta T)/dT$ can be made small in magnitude by increasing the bridge resistance and/or by improving the thermal symmetry of the flexure beam.

The factor $\Delta TCR$ can have a significant effect on ZTC. The factor $(1 \times 10^4/2G\epsilon_o$ varies, in actual sample products, in the range of 0.5 to $1.2 \times 10^6$; so that an absolute value of $\Delta TCR$ of about $1 \times 10^{-6}/°F$. results in a contribution of about $1\%/100°$ F. to ZTC. Applicants have discovered that TCR varies as a function of the position of the flexure bodies during sputtering deposition using the apparatus of FIGS. 2 and 3. Those skilled in the art will understand that similar effects may exist in other thin film deposition processes where similar geometric conditions exist, such as now will be discussed.

Since $\Delta TCR$ is measured between the tension and compression arms of the bridge, its calculated contribution to ZTC is in the range of $\pm 1.7$ to $\pm 3.6\%/100°$ F., depending on whether the tension or compression arms are located closer to the center of pallet 56. Actual measurement for flexure elements oriented radially (elements B and C) show a variation of $\pm 3$ to $\pm 5\%/100°$ F., in good agreement with theory. However, beams oriented tangentially (element A) show much lower contributions to ZTC in the range of $\pm 0.5\% 100°$ F. Thus, applicants have found that by orienting the tension and compression arms on each side of the bridge essentially tangentially to circles concentric with the centers of pallet 56 and target 54, the contribution of $\Delta TCR$ to ZTC can be reduced essentially to zero. For example, resistances 34, 38 are arranged essentially tangentially to one concentric circle; and resistances 36, 40, to another; so that the resistances on each side of the bridge are essentially equidistant from the center of the deposition apparatus. Actual resistor geometries as shown in FIG. 1 are defined by selective removal of deposited layers, using known techniques.

For the sputter deposition process disclosed in Ser. No. 908,808, $TCR_f$ and $d(\Delta T)/dT$ will be negative, so that the first term of Equation (11b) will be positive. Since $dT_2/dT$ is positive, the sign of the second term will depend on the sign and value of $\Delta TCR$ which, as shown in FIG. 3, can be selected to be positive or negative depending on the orientation of the flexure body during deposition. Since for the radial orientation, the term $\Delta TCR$ dominates ZTC as previously discussed, the sign of ZTC will change with the orientation of the flexure bodies. Thus, the product of $TCR_f$ and $d(\Delta T/dT)$ can be made small and positive; whereas, the product of $\Delta TCR$ and $dT_2/dT$ can be made small and negative, thereby yielding a value of ZTC which is substantially zero.

Referring again to Equation (9), it can be assumed within reason that only $\Delta T$ and $T$ are time dependent when power is applied to the bridge; thus, transient behavior is described by:

$$\frac{d\frac{E_o}{V}}{dt} = (TCR_f)\frac{d(\Delta T)}{dt} + \Delta TCR \frac{dT_2}{dt} \quad (12)$$

Typical data for warm-up as a function of time and bridge resistances are shown in FIG. 6. Transient behavior can be improved by decreasing $\Delta TCR$, lowering the power density of the bridge and improving the thermal symmetry of the flexure beam. The time dependence is given by Equation 12 but the offset in output at steady state is given by Equation 9 with $\epsilon$ equal to zero, as follows:

$$\xi = \text{Warm-up Offset} = \frac{1}{2}[[TCR_f]\Delta T + \Delta TCR \cdot T_2] \quad (13)$$

At a given temperature, $\xi$ increases with increasing $\Delta T$ if $\Delta TCR$ is negligible. On the other hand, $\Delta T$ increases with decreasing bridge resistance and increasing power density $(I^2R)/A$. Warm-up effects may range from less than 0.1 mV/V for 5500$\Omega$ bridges to more than 1.5 mV/V for a 350$\Omega$ bridge, will the full scale output in the 3.0 to 5.0 mV/V range. By increasing the bridge resistance and spreading the resistor runs over a wider area on the flexure body, $\Delta T$ may be reduced correspondingly so that transient effects are minimized.

From the foregoing, the total thermal error $\beta$ is seen to be defined by:

$$\beta(\%/100° F.) = STC(\epsilon) + ZTC \quad (14)$$

Error may be reduced to zero by satisfying either of the following conditions:

$$STC = ZTC = 0 \quad (15a)$$

or $$STC + ZTC = 0 \quad (15b)$$

As discussed previously, STC and ZTC individually can be adjusted to be substantially equal to zero; so that the conditions of Equation 15a essentially can be satisfied for all levels of strain. However, since STC is a function of strain, the conditions of Equation 15b can only be met at a unique strain or applied force. This approach is desirable where an instrument is desired which is accurate over only a small range of applied forces. In most practical cases, however, STC and ZTC are individually adjusted as previously described so that their individual effects are minimized. To a second order, it is preferred to make STC and ZTC of opposite sign so that they tend to cancel each other.

Industrial Applicability

The invention is especially suited for use in force sensors such as fluid pressure transducers; however, the principles of the process and apparatus also may be applied with facility to accelerometers, load cells and other sensors in which a force to be measured can be used to deflect a flexure body.

Having described our invention in sufficient detail to enable those skilled in the art to make and use it, we claim:

1. An improved deformable flexure element for use in a strain gage transducer, comprising:
    a deformable body having at least one flat surface, a first portion of said body beneath said surface being subjected to tension during deformation of said body and a second portion of said body beneath said surface being subjected to compression during said deformation;
    at least one pair of resistances deposited on said surface, with one resistance of the pair above each of said first and second portions, the arrangement of the body and resistances being such that heat flows asymmetrically from said resistances;
    said body and said resistances being made of materials such that $$[TCR_f]\frac{d(\Delta T)}{dT} + \Delta TCR \frac{dT_2}{dT}$$

substantially equals zero, where $TCR_f$ is the thermal resistance coefficient of the resistances; $\Delta T$ is the temperature gradient between the resistances on said first and second portions; $T$ is the ambient temperature; $\Delta TCR$ is the gradient of the thermal resistance coefficient between the resistances on said first and second portion; and $T_2$ is the temperature of said second portion whereby thermal conditions of the transducer are effectively prevented from providing spurious strain indications.

2. The improvement according to claim 1, wherein both $$TCR_f \frac{d(\Delta T)}{dT} \text{ and } \Delta TCR \frac{dT_2}{dT}$$

are substantially equal to zero.

3. An improved deformable flexure element for use in a strain gage transducer, comprising:
    a deformable body having at least one flat surface, a first portion of said body beneath said surface being subjected to tension during deformation of said body and a second portion of said body beneath said surface being subjected to compression during said deformation;
    at least one pair of resistances deposited on said surface, with one resistance of the pair above each of said first and second portions;
    said body and said resistances being made of materials such that $$[TCR_f]\frac{d(\Delta T)}{dT} + \Delta TCR \frac{dT_2}{dT}$$

substantially equals zero, where $TCR_f$ is the thermal resistance coefficient of the resistance; $\Delta T$ is the temperature gradient between the resistance on said first and second portions; T is the ambient temperature; $\Delta TCR$ is the gradient of the thermal resistance coefficient between the resistance on said first and second portions; and $T_2$ is the temperature of said second portion, said body being formed of 17-4 pH stainless steel and said resistances comprising Ta—$Ta_2O_5$ cermet films deposited at a rate of 30 to 150 Angstroms per minute under a bias from zero to minus 250 volts at a temperature of from 150° to 350° C., and annealed from 2 to 24 hours at a temperature of from 300° to 600° C. in an argon or nitrogen atmosphere.

4. An improved deformable flexure element for use in a strain gage transducer, comprising:

a deformable body having at least one flat surface, a first portion of said body beneath said surface being subjected to tension during deformation of said body and a second portion of said body beneath said surface being subjected to compression during said deformation;

at least one pair of resistances deposited on said surface, with one resistance of the pair above each of said first and second portions;

said body and said resistances being made of materials such that $$[TCR_f]\frac{d(\Delta T)}{dT} + \Delta TCR \frac{dT_2}{dT}$$

substantially equals zero, where $TCR_f$ is the thermal resistance coefficient of the resistances; $\Delta T$ is the temperature gradient between the resistances on said first and second portions; T is the ambient temperatures; $\Delta TCR$ is the gradient of the thermal resistance coefficient between the resistance on said first and second portions; and $T_2$ is the temperature of said second portion, said body being formed of 17-4 pH stainless steel and said resistances comprising Ta—$Ta_2O_5$ cermet films deposited at a rate of 30 to 150 Angstroms per minute under a bias of minus 50 volts at a temperature of 300° C., and annealed for 2 hours at a temperature of 400° C. in an argon or nitrogen atmosphere.

5. An improved deformable flexure element for use in a strain gage transducer, comprising:

a deformable body having at least one flat surface, a first portion of said body beneath said surface being subjected to tension during deformation of said body and a second portion of said body beneath said surface being subjected to compression during said deformation;

at least one pair of resistances deposited on said surface with one resistance of the pair above each of said first and second portions, the arrangement of the body and resistances being such that heat flows asymmetrically from said resistances;

said body and said resistances being made of materials such that

TCG−TCE substantially equals zero, where TCG is the thermal coefficient of the gage factor of the flexure element and TCE is the thermal coefficient at constant strain for the Young's modulus of the material of the body, whereby the span temperature coefficient of a transducer comprising the body is reduced essentially to zero and thermal conditions of the transducer are effectively prevented from providing spurious strain indications.

6. An improved deformable flexure element for use in a strain gage transducer, comprising:

a deformable body having at least one flat surface, a first portion of said body beneath said surface being subjected to tension during deformation of said body and a second portion of said body beneath said surface being subjected to compression during said deformation;

at least one pair of resistances deposited on said surface with one resistance of the pair above each of said first and second portions;

said body and said resistances being made of materials such that

TCG−TCE substantially equals zero, where TCG is the theraml coefficient of the gage factor of the flexure element and TCE is the thermal coefficient at constant strain for the Young's modulus of the material of the body, whereby the span temperature coefficient of a transducer comprising the body is reduced essentially to zero, said body being formed of 17-4 pH stainless steel and said resistances comprising Ta—$Ta_2O_5$ cermet films deposited at a rate of from 30 to 100 Angstroms per minute under a bias of minus 50 volts at a temperature of 300° C. and annealed for 2 hours at a temperature of 400° C. in a nitrogen atmosphere.

7. An improved deformable flexure element for use in a strain gage transducer, comprising:

a deformable body having at least one flat surface; a first portion of said body beneath said surface being subjected to tension during deformation of said body and a second portion of said body beneath said surface being subjected to compression during said deformation;

at least one pair of resistances deposited on said surface, with one resistance of the pair above each of said first and second portions, the arrangement of the body and resistances being such that heat flows asymmetrically from said resistances;

said body and said resistances being made of materials such that $$\frac{1 \times 10^4 \, G\epsilon \, (TCG - TCE)}{G\epsilon_o} + \frac{1 \times 10^4}{2G\epsilon_o}\left[[TCR_f]\frac{d(\Delta T)}{dT} + \Delta TCR \frac{dT_2}{dT}\right]$$

substantially equals zero, where G is the gage factor of the flexure element; $\epsilon$ is strain at a given deflection of the body; $\epsilon_o$ is strain at full scale deflection of the body; TCG is the thermal coefficient of the gage factor; TCE is the thermal coefficient at constant strain for the Young's modulus of the material of the body; $TCR_f$ is the thermal resistance coefficient of the resistances; ΔT is the temperature gradient between the resistances on said first and second portions; T is the ambient temperature; ΔTCR is the gradient of the thermal resistance coefficient between the resistances on said first and second portions; and $T_2$ is the temperature of said second portion whereby thermal conditions of the transducer are effectively prevented from providing spurious strain indications.

8. An improved deformable flexure element for use in a strain gage transducer, comprising:
a deformable body having at least one flat surface, a first portion of said body beneath said surface being subjected to compression during said deformation;
at least one pair of resistances deposited on said surface, with one resistance of the pair above each of said first and second portions;
said body and said resistances being made of materials such that $$\frac{1 \times 10^4 \, G\epsilon \, (TCG - TCE)}{G\epsilon_o} +$$

$$\frac{1 \times 10^4}{2G\epsilon_o} \left[ TCR_f \frac{d(\Delta T)}{dT} + \Delta TCR \frac{dT_2}{dT} \right]$$

substantially equals zero, where G is the gage factor of the flexure element; $\epsilon$ is strain at a given deflection of the body; $\epsilon_o$ is strain at full scale deflection of the body; TCG is the thermal coefficient of the gage factor; TCE is the thermal coefficient at constant strain for the Young's modulus of the material of the body; $TCR_f$ is the thermal resistance coefficient of the resistances; ΔT is the temperature gradient between the resistances on said first and second portions; T is the ambient temperature; ΔTCR is the gradient of the thermal resistance coefficient between the resistances on said first and second portions; and $T_2$ is the temperature of said second portion, said body being formed of 17-4 pH stainless steel and said resistances comprising Ta—$Ta_2O_5$ cermet films deposited at a rate of from 30 to 100 Angstroms per minute under a bias of minus 50 volts at a temperature of 300° C. and annealed for 2 hours at a temperature of 400° C. in a nitrogen atmosphere.

9. An improved deformable flexure element for use in a strain gage transducer, comprising:
a deformable body having at least one flat surface, a first portion of said body beneath said surface being subjected to tension during deformation of said body and a second portion of said body beneath said surface being subjected to compression during said deformation;
at least one pair of resistances deposited on said surface, with one resistance of the pair above each of said first and second portions;
said body and said resistances being made of materials such that $$[TCR_f] \frac{d(\Delta T)}{dT} + \Delta TCR \frac{dT_2}{dT}$$

substantially equals zero, where $TCR_f$ is the thermal resistance coefficient of the resistances; ΔT is the temperature gradient between the resistances on said first and second portions; T is the ambient temperature; ΔTCR is the gradient of the thermal resistance coefficient between the resistances on said first and second portions; and $T_2$ is the temperature of said second portion, said body being formed of 17-4 pH stainless steel and said resistances comprising tantalum-oxygen-nitrogen films deposited at a rate of 30 to 150 Angstroms per minute under a bias of minus 50 volts at a temperature of 300° C., and annealed for 2 hours at a temperature of 400° C. in an argon or nitrogen atmosphere.

10. An improved deformable flexure element for use in a strain gage transducer, comprising:
a deformable body having at least one flat surface, a first portion of said body beneath said surface being subjected to tension during deformation of said body and a second portion of said body beneath said surface being subjected to compression during said deformation;
at least one pair of resistances deposited on said surface, with one resistance of the pair above each of said first and second portions;
said body and said resistances being made of materials such that $$[TCR_f] \frac{d(\Delta T)}{dT} + \Delta TCR \frac{dT_2}{dT}$$

substantially equals zero, where $TCR_f$ is the thermal resistance coefficient of the resistances; ΔT is the temperature gradient between the resistances on said first and second portions; T is the ambient temperature; ΔTCR is the gradient of the thermal resistance coefficient between the resistances on said first and second portions; and $T_2$ is the temperature of said second portion, said body being formed of 17-4 pH stainless steel and said resistances comprising chromium-silicon-oxygen films deposited at a rate of 30 to 150 Angstroms per minute under a bias of minus 50 volts at a temperature of 300° C., and annealed for 2 hours at a temperature of 400° C. in an argon or nitrogen atmosphere.

11. An improved deformable flexure element for use in a strain gage transducer, comprising:
a deformable body having at least one flat surface, a first portion of said body beneath said surface being subjected to tension during deformation of said body and a second portion of said body beneath said surface being subjected to compression during said deformation.
at least one pair of resistances deposited on said surface with one resistance of the pair above each of said first and second portions;
said body and said resistances being made of materials such that

TCG − TCE substantially equals zero, where TCG is the thermal coefficient of the gage factor of the flexure element and TCE is the thermal coefficient at constant strain for the Young's modulus of the material of the body, whereby the span temperature coefficient of a transducer comprising the body is reduced essentially to zero, said body being formed of 17-4 pH stainless steel and said resistances comprising tantalum-oxygen-nitrogen films deposited at a rate of 30 to 150 Angstroms per minute under a bias of minus 50 volts at a temperature of 300° C., and annealed for 2 hours at a temperature of 400° C. in an argon or nitrogen atmosphere.

12. An improved deformable flexure element for use in a strain gage transducer, comprising:
a deformable body having at least one flat surface, a first portion of said body beneath said surface being subjected to tension during deformation of said body and a second portion of said body beneath said surface being subjected to compression during said deformation;
at least one pair of resistances deposited on said surface with one resistance of the pair above each of said first and second portions;
said body and said resistances being made of materials such that $$TCG - TCE$$

substantially equals zero, where TCG is the thermal coefficient of the gage factor of the flexure element and TCE is the thermal coefficient at constant strain for the Young's modulus of the material of the body, whereby the span temperature coefficient of a transducer comprising the body is reduced essentially to zero, said body being formed of 17-4 pH stainless steel and said resistances comprising chromium-silicon-oxygen films deposited at a rate of 30 to 150 Angstroms per minute under a bias of minus 50 volts at a temperature of 300° C., and annealed for 2 hours at a temperature of 400° C. in an argon or nitrogen atmosphere.

13. An improved deformable flexure element for use in a strain gage transducer, comprising:
a deformable body having at least one flat surface, a first portion of said body beneath said surface being subjected to tension during deformation of said body and a second portion of said body beneath said surface being subjected to compression during said deformation;
at least one pair of resistances deposited on said surface, with one resistance of the pair above each of said first and second portions;
said body and said resistances being made of materials such that $$\frac{1 \times 10^4 \, G\epsilon \, (TCG - TCE)}{G\epsilon_o} +$$

$$\frac{1 \times 10^4}{2G\epsilon_o} \left[ [TCR_f] \frac{d(\Delta T)}{dT} + \Delta TCR \frac{dT_2}{dT} \right]$$

substantially equals zero, where G is the gage factor of the flexure element; $\epsilon$ is strain at a given deflection of the body; $\epsilon_o$ is strain at full scale deflection of the body; TCG is the thermal coefficient of the gage factor; TCE is the thermal coefficient at constant strain for the Young's modulus of the material of the body; $TCR_f$ is the thermal resistance coefficient of the resistances; $\Delta T$ is the temperature gradient between the resistances on said first and second portions; T is the ambient temperature; $\Delta TCR$ is the gradient of the thermal resistance coefficient between the resistances on said first and second portions; and $T_2$ is the temperature of said second portion, said body being formed of 17-4 pH stainless steel and said resistances comprising tantalum-oxygen-nitrogen films deposited at a rate of 30 to 150 Angstroms per minute under a bias of minus 50 volts at a temperature of 300° C., and annealed for 2 hours at a temperature of 400° C. in an argon or nitrogen atmosphere.

14. An improved deformable flexure element for use in a strain gage transducer, comprising:
a deformable body having at least one flat surface, a first portion of said body beneath said surface being subjected to tension during deformation of said body and a second portion of said body beneath said surface being subjected to compression during said deformation;
at least one pair of resistances deposited on said surface, with one resistance of the pair above each of said first and second portions;
said body and said resistances being made of materials such that $$\frac{1 \times 10^4 \, G\epsilon \, (TCG - TCE)}{G\epsilon_o} +$$

$$\frac{1 \times 10^4}{2G\epsilon_o} \left[ [TCR_f] \frac{d(\Delta T)}{dT} + \Delta TCR \frac{dT_2}{dT} \right]$$

substantially equals zero, where G is the gage factor of the flexure element; $\epsilon$ is strain at a given deflection of the body; $\epsilon_o$ is strain at full scale deflection of the body; TCG is the thermal coefficient of the gage factor; TCE is the thermal coefficient at constant strain for the Young's modulus of the material of the body; $TCR_f$ is the thermal resistance coefficient of the resistances; $\Delta T$ is the temperature gradient between the resistances on said first and second portions; T is the ambient temperature; $\Delta TCR$ is the gradient of the thermal resistance coefficient between the resistances on said first and second portions; and $T_2$ is the temperature of said second portion, said body being formed of 17-4 pH stainless steel and said resistances comprising chromium-silicon-oxygen films deposited at a rate of 30 to 150 Angstroms per minute under a bias of minus 50 volts at a temperature of 300° C., and annealed for 2 hours at a temperature of 400° C. in an argon or nitrogen atmosphere.

15. The strain gage transducer structure of claims 1, 5 or 7 wherein said body comprises a metallic body.

16. The strain gage transducer structure of claims 1, 5 or 7 wherein said resistances comprise cermet film resistances.

17. The strain gage transducer structure of claims 1, 5 or 7 wherein said resistances comprise thin film resistances.

18. The strain gage transducer structure of claims 1, 5 or 7 wherein said resistances comprise thin film metal oxide resistances.

* * * * *